Sept. 1, 1925.
F. E. ARROUQUIER
ENVELOPE MAKING MACHINE
Filed May 5, 1924
1,551,924
10 Sheets-Sheet 4
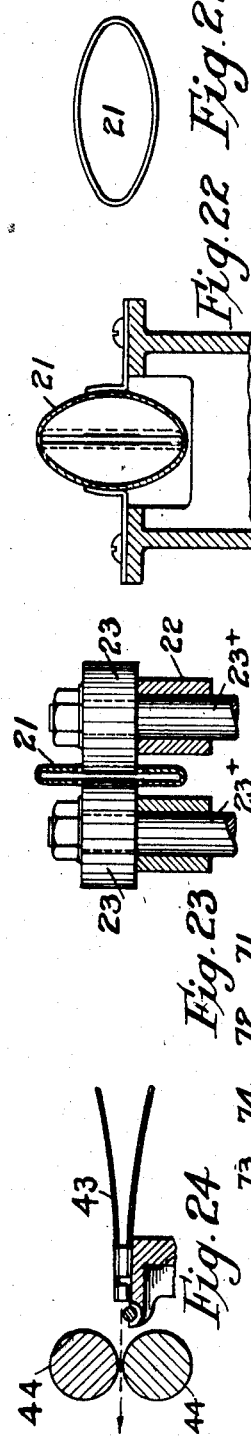
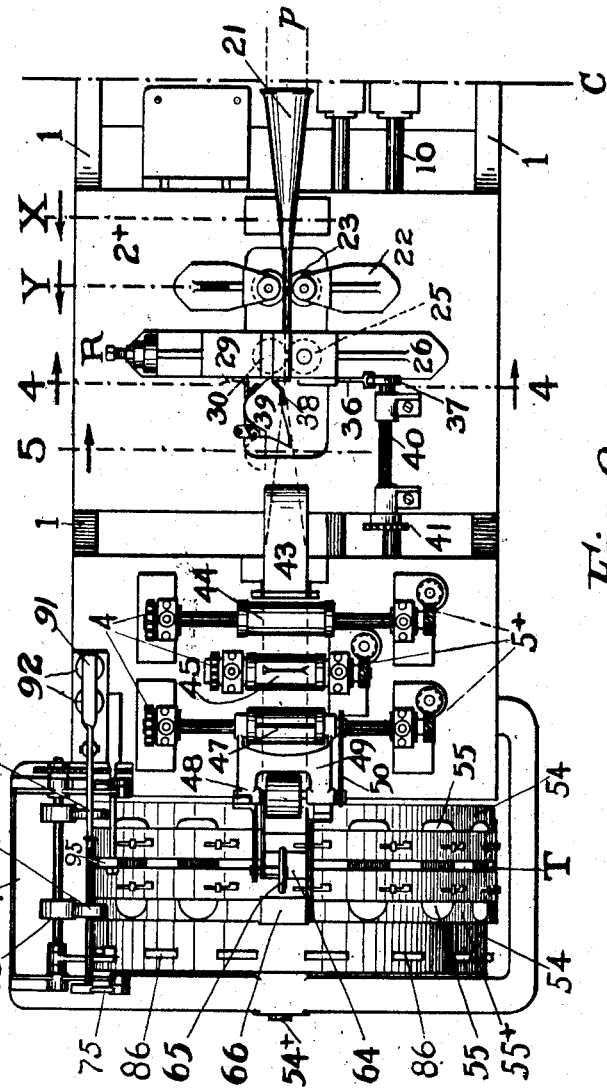
Inventor
Frederick E. Arrouquier.
By Chas. H. Burleigh
Attorney.

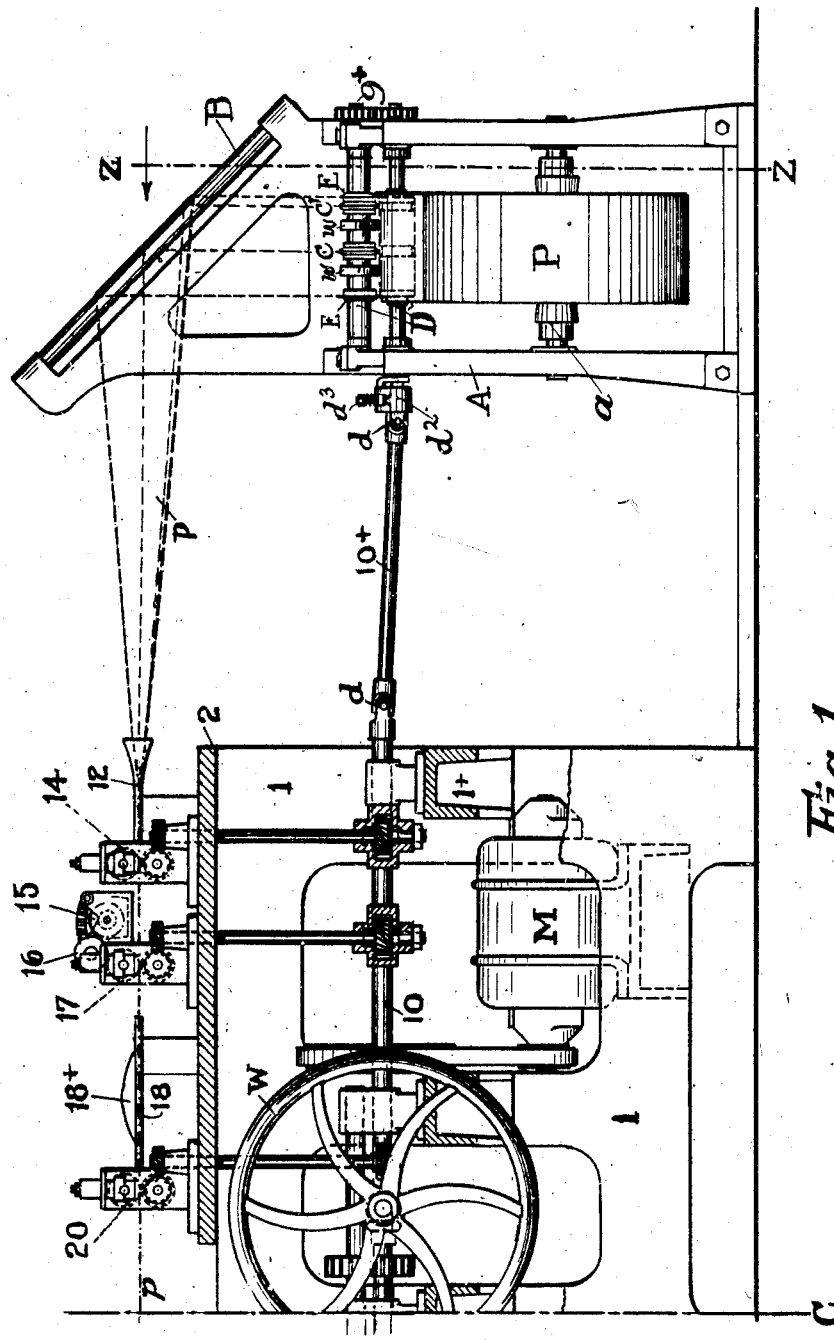

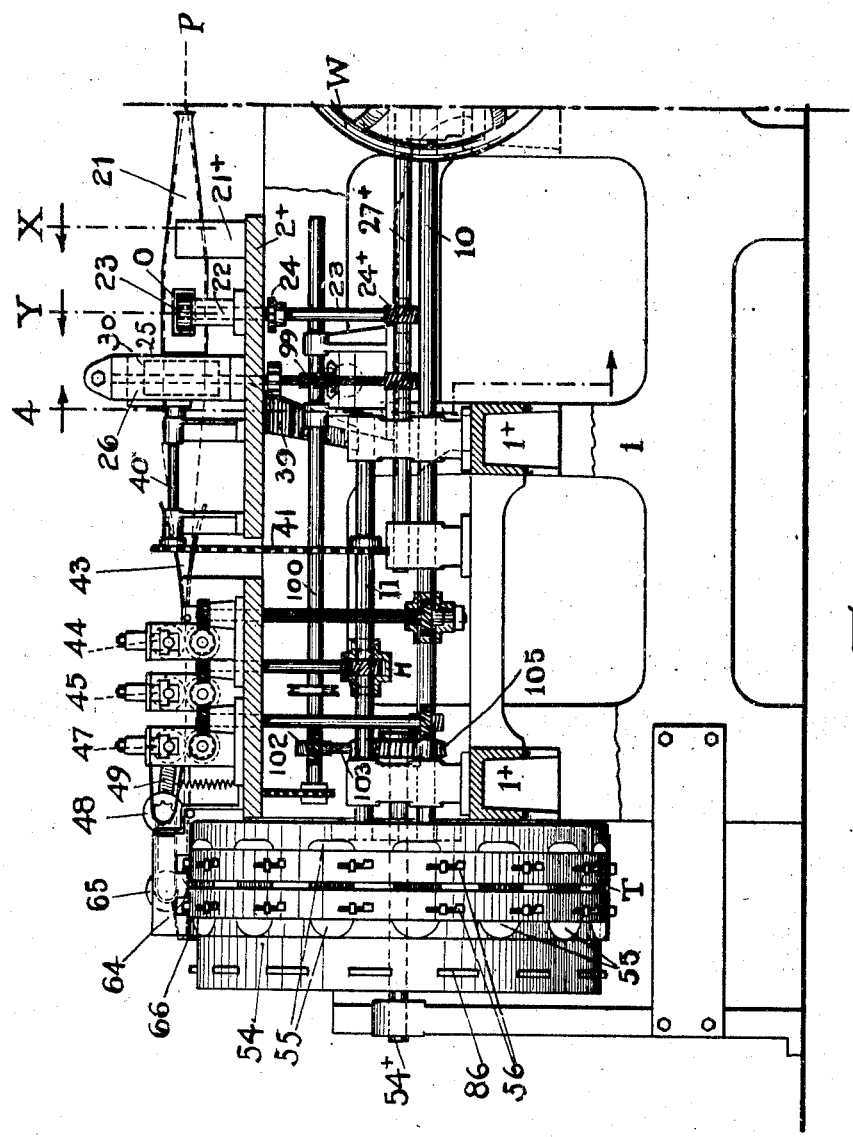

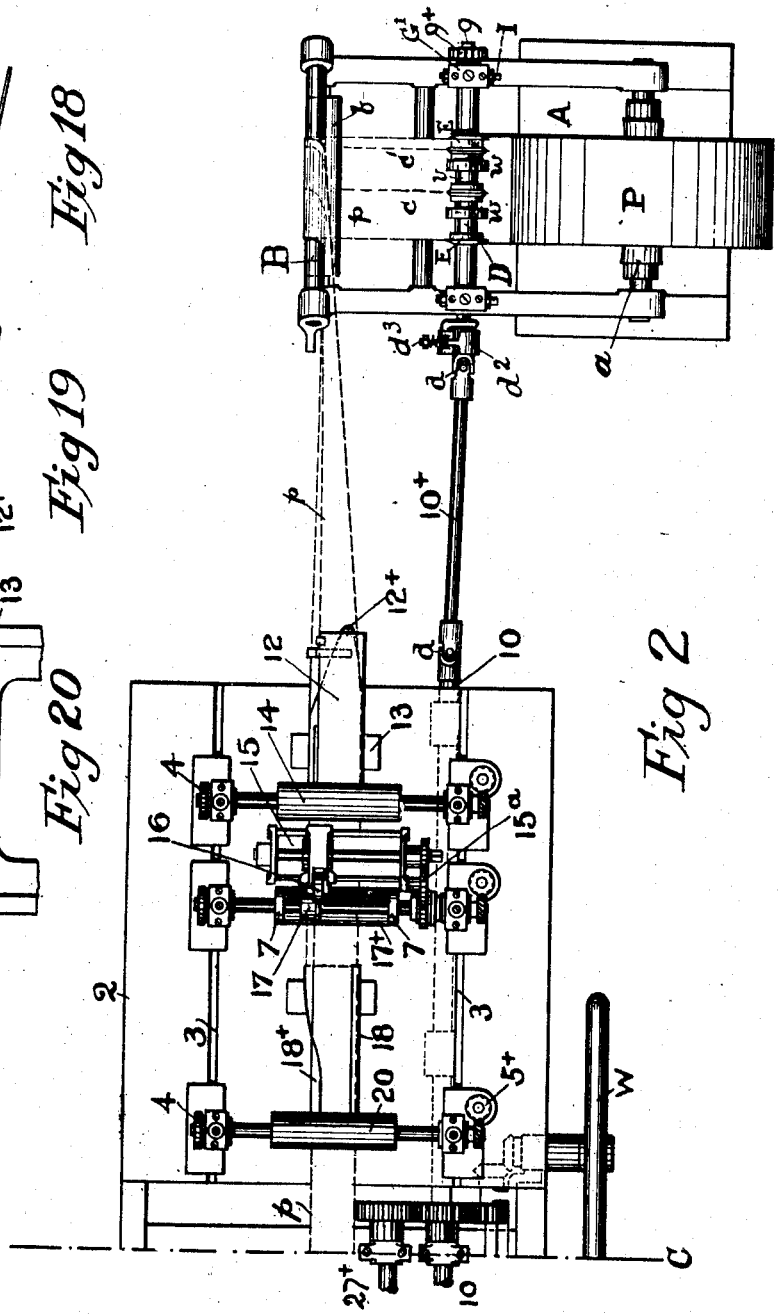

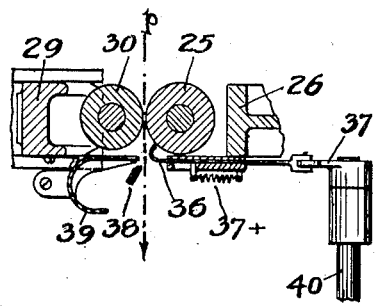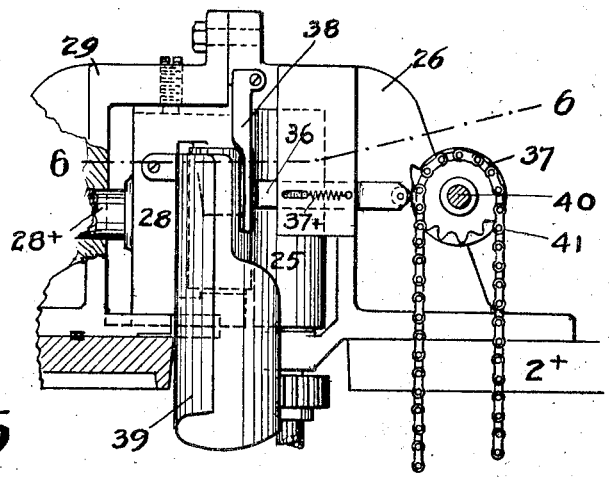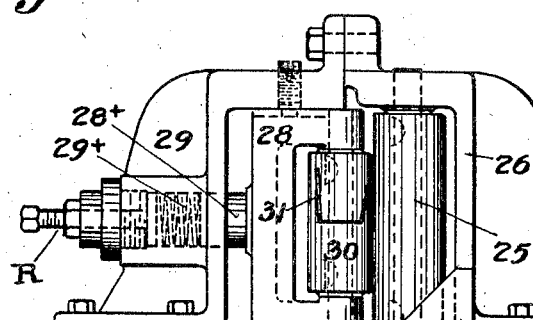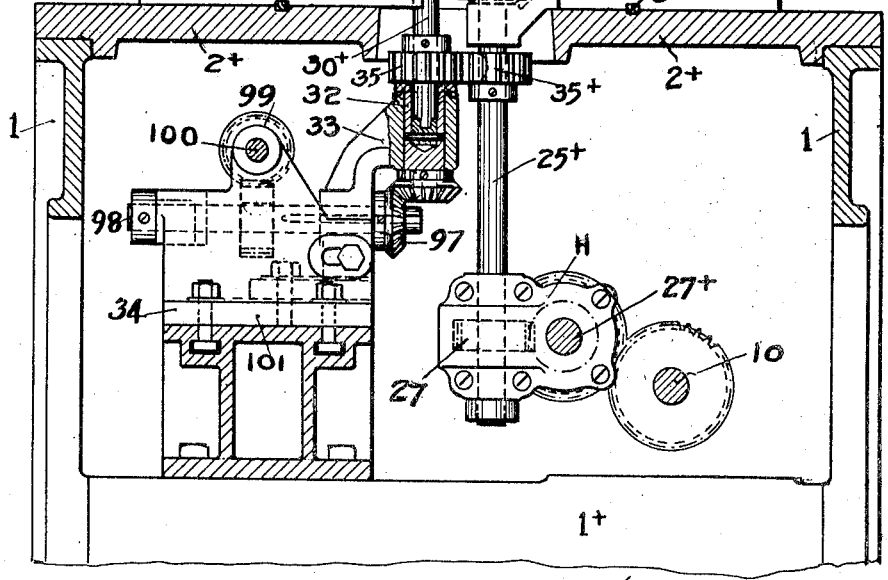

Sept. 1, 1925.
F. E. ARROUQUIER
1,551,924
ENVELOPE MAKING MACHINE
Filed May 5, 1924   10 Sheets-Sheet 7
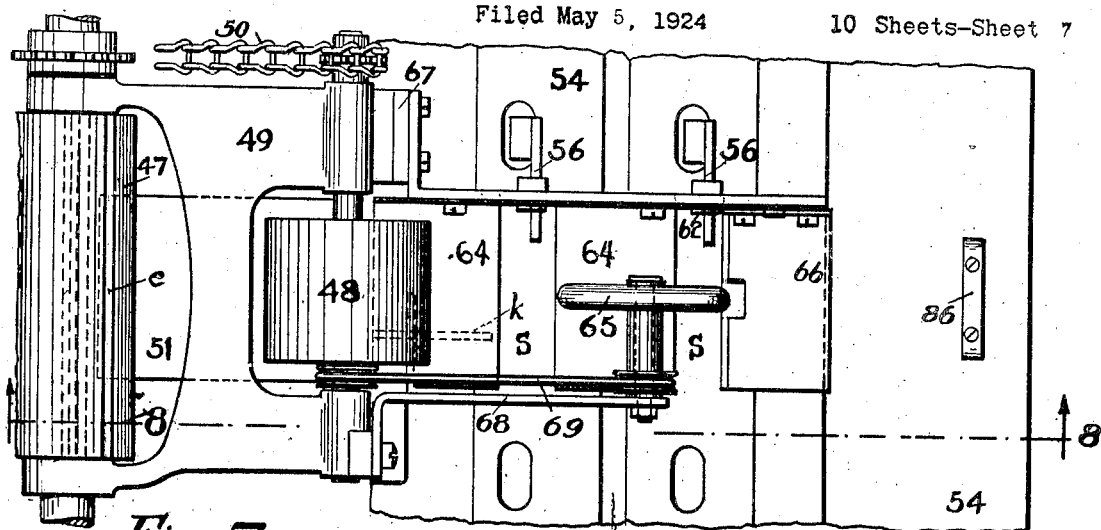
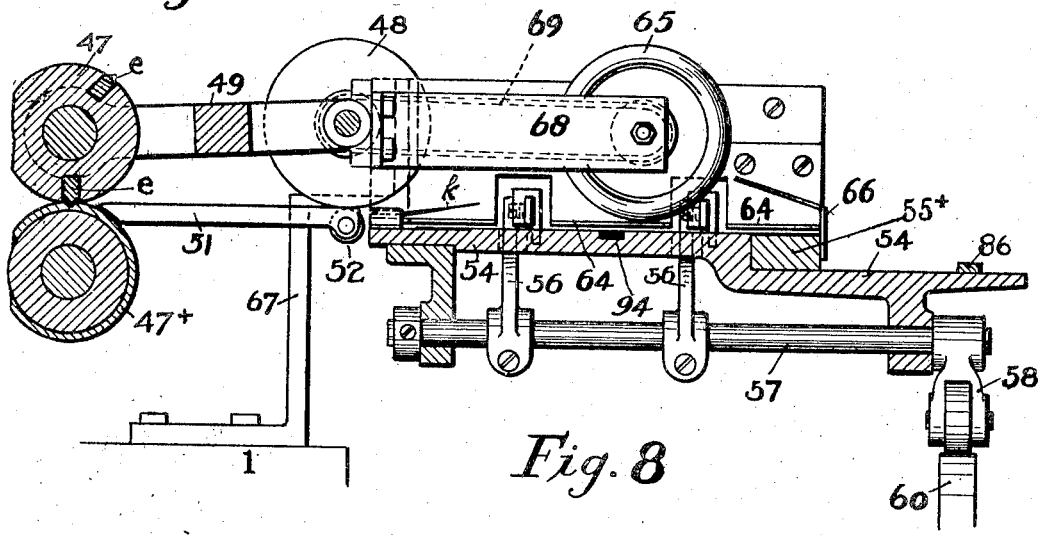
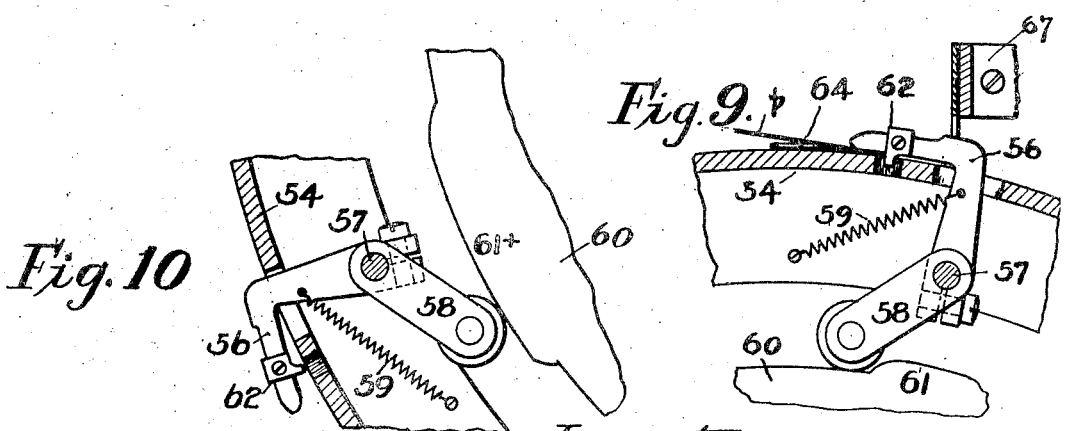
Inventor
Frederick E. Arrouquier,
By Chas. H. Burleigh,
Attorney.

Sept. 1, 1925. 1,551,924
F. E. ARROUQUIER
ENVELOPE MAKING MACHINE
Filed May 5, 1924 10 Sheets-Sheet 8
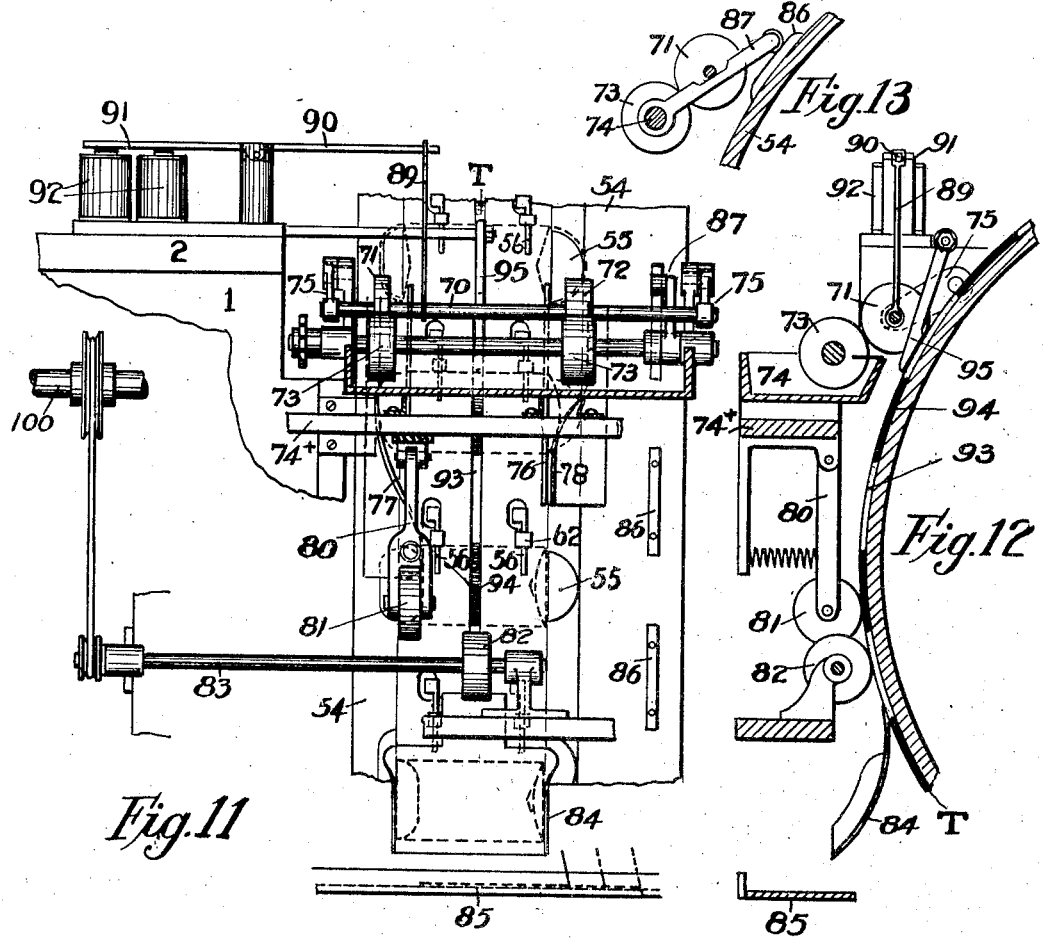
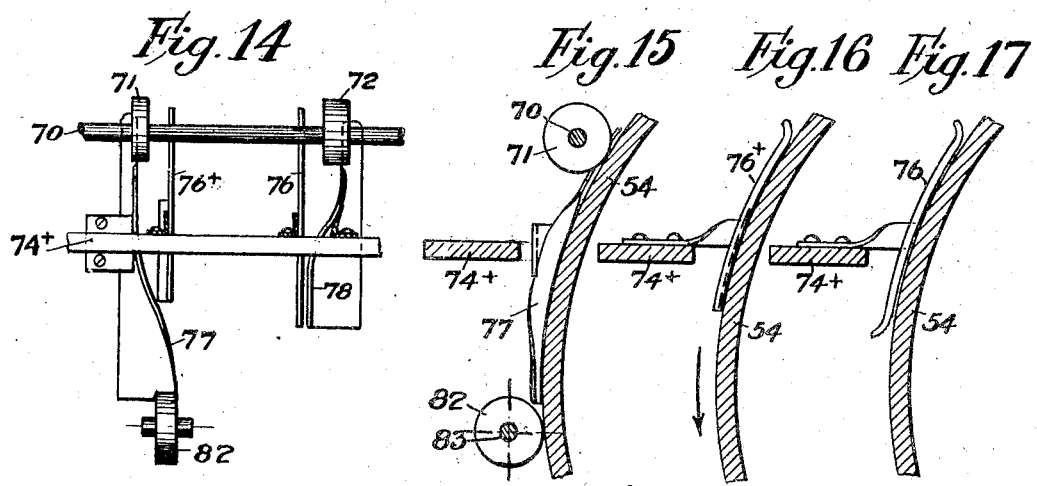
Inventor
Frederick E. Arrouquier
By Chas. H. Burleigh,
Attorney Inventor
Frederick E. Arrouquier
By Chas H Burleigh
Attorney

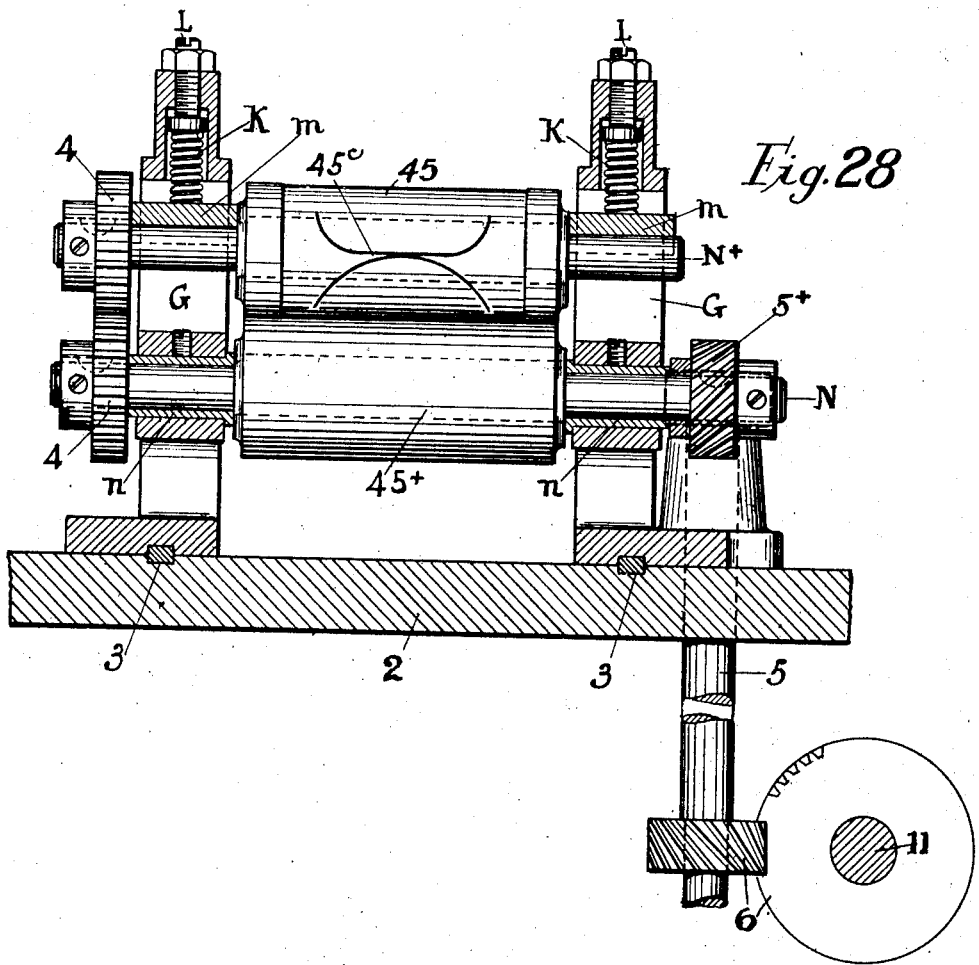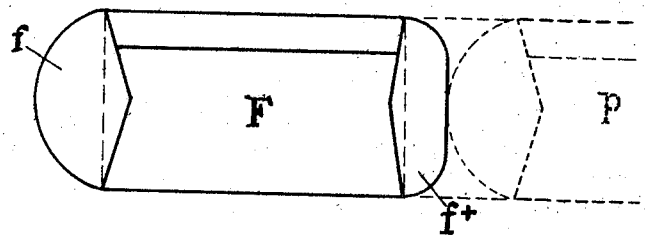

Patented Sept. 1, 1925.

1,551,924

UNITED STATES PATENT OFFICE.

FREDERICK E. ARROUQUIER, OF SHREWSBURY, MASSACHUSETTS, ASSIGNOR OF ONE-HALF TO REBLIN MANUFACTURING COMPANY, INC., A CORPORATION OF NEW YORK.

ENVELOPE-MAKING MACHINE.

Application filed May 5, 1924. Serial No. 711,200.

*To all whom it may concern:*

Be it known that I, FREDERICK E. ARROUQUIER, a citizen of the United States, residing at Shrewsbury, in the county of Worcester and State of Massachusetts, have invented certain new and useful Improvements in Envelope-Making Machines, of which the following is a specification.

My present invention relates to a novel organization in mechanism for making open-end envelopes from a continuous web of paper or like fabric, and to the construction and combinations of means for performing the several operations required in the production of such envelopes; the prime object of the invention being to provide an efficient and desirable envelope machine which can be successfully operated at a comparatively high rate of production; requiring only a relatively small amount of power for its operation; and creating but little noise while running.

Another object is to provide an envelope making machine of the character specified, with means substantially as described, for trimming, controlling, gathering and forming the paper web into a closed flat tube, in the manner set forth.

Another object is to provide in an envelope making machine efficient means for transposing the flatwise plane relation of the advancing tube, without rotation thereof, to a flatwise plane approximately at right angles to its former plane; also means for removing from the transposed portion of the tube, a waste section or scrap in a manner to develop end-openings and united end-flaps for adjacent envelope blanks; and means for subsequently restoring the transposed plane of the tube to its original flatwise plane.

A further object is the provision of means for separating an envelope blank from the tube, projecting it at increased velocity to a predetermined position, means for there arresting the advancement of said blank, and for regulating its register alinement preceding the transfer of said blank to final gumming and folding means.

A further object is to provide in an envelope making machine mechanism for producing tubular envelope blanks and delivering them at a predetermined position; of means adapted for seizing the individual blanks and laterally conveying them successively into conjunction with means for gumming the bottom-flap and sealing flap, and to flap-folding devices, and for releasing the envelope at a given place of discharge.

A further object is the provision in combination with means for producing and successively presenting tubular envelope blanks at a predetermined position, of a rotary carrier means, provided with a series of successively actuated devices, for taking the blanks laterally from said position to a final gumming and folding mechanism.

Another object is the provision of a rotary, laterally acting blank-transferring carrier, in combination with the flap gumming and folding devices, and including means for controlling the application of gum, or preventing deposit of gum when no blank is presented for its reception.

Minor objects and features of improvement will appear as set forth in the following detailed description, and illustrated in the drawings; the particular subject matter claimed as my invention being hereinafter definitely specified.

In the drawings, ten sheets, Fig. 1 (see Sheets 1 and 2) represents a front view of an envelope machine embodying my invention.

Figure 2 (see Sheets 3 and 4) represents a plan view of the same.

Fig. 4 is a transverse vertical section, at line 4—4, on larger scale, of mechanism for cutting out a waste section from the transposed plane of the tube.

Fig. 5 is a fragmentary view, adjacent the same position, illustrating means for positively discharging the cut-out waste section.

Fig. 6 is a horizontal section at line 6—6 on Fig. 5.

Fig. 7 is a plan view of a portion of the transverse carrier and means for delivering the individual blanks thereto.

Fig. 8 is an elevation view of the same, with the carrier shown in section at line 8—8 on Fig. 7.

Fig. 9 is a fragmentary section of the carrier rim with one of the grip devices at position of taking an envelope blank.

Fig. 10 is a corresponding view at position of discharging the envelope.

Fig. 11 is a rear elevation view illustrating the flap-gumming mechanism, flap-folding, and discharge devices in combination with the rotary carrier.

Fig. 12 is a part vertical section view of the same.

Fig. 13 is a fragmentary detail of means for lifting the gummer rolls.

Fig. 14 is a detached back view of the flap-folding members.

Figs. 15, 16 and 17 are sectional views of a portion of the carrier rim showing the arrangement of the folder members in relation thereto.

Figs 18, 19 and 20 (on Sheet 3) are detail views illustrating the structure of the web-folding guide.

Figs. 21, 22 and 23 (on Sheet 4) are separate detail views illustrating means for transposing the flatwise plane of the envelope tube; Fig. 21 showing the mouth of the guide; Fig. 22 a cross-section at line X on Fig. 2, Fig. 23 a vertical section at line Y on Fig. 2.

Fig. 24 is a detached view of the plane-restoring means and draft-rolls.

Figure 25:
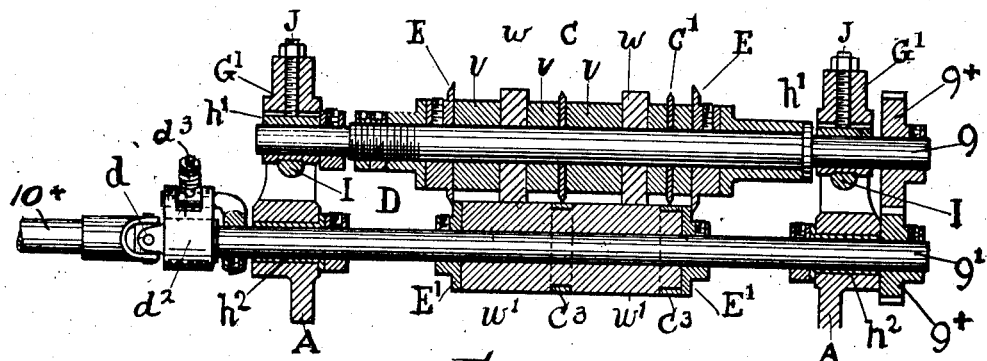

Fig. 25 is a longitudinal section of the web-drawing and trimming rolls.

Figure 26:
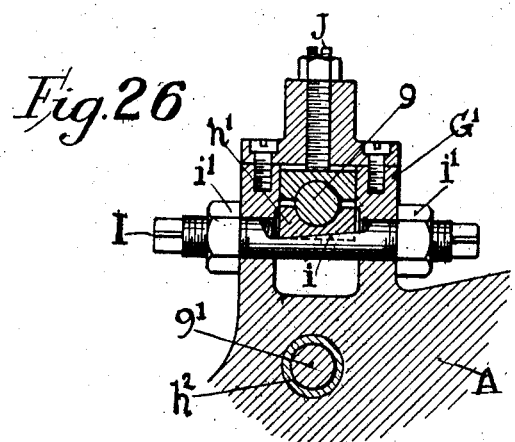

Fig. 26 is a transverse vertical section of one of the bearing housings therefor, on somewhat larger scale.

Figure 27:
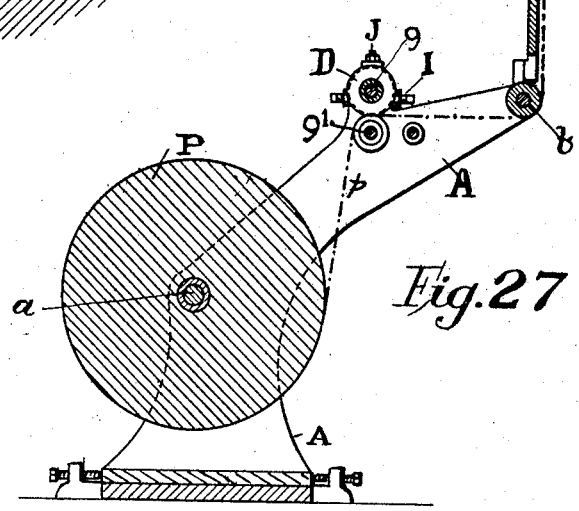

Fig. 27 is a sectional elevation of the web-supporting stand, at line Z, Z, Fig. 1, (on the same scale as Figs. 1 and 2).

Fig. 28 is a vertical sectional view showing the cutting-off rolls; also, illustrating the way and manner in which the several pairs of rolls in the working series are respectively mounted and operated; and Fig. 29 represents the envelope blank as produced with its flaps extended.

Referring to the drawings, the numeral 1 indicates the main frame, of suitable construction for supporting the various operative parts of the organized machine. As here shown said frame consists of longitudinal side members at suitable distance apart and rigidly united at the top horizontal by table plates 2, and by suitable transverse girts or cross-bars 1$^x$ below; the housings and the working mechanisms being arranged in the manner substantially as illustrated and as more fully hereinafter explained.

Numeral 10 indicates the main operating shaft to which power and motion may be applied from an electric motor M, or otherwise by well known means from any approved source.

On the drawings Fig. 1 and Fig. 2, for each of which two separate sheets are used to show the machine in its full length, it will be understood that the dot-and-dash line C indicates the position at which the respective portions shown are in reality united in the actual machine structure.

The working mechanism includes, as a prominent part thereof, a series of roller elements arranged in pairs, in successive alinement along the top of the table, respectively journaled in parallel relation in suitable bearings supported by housings that stand upon and are secured to the table on bed-plates, which plates are preferably provided with longitudinal parallel ways or grooves 3, to which the bases of the respective housings are co-matchingly fitted, to maintain accurate alinement of the series, while permitting adjustment of some of the parts longitudinally of their alinement.

The arrangement and mountings for the individual pairs of rolls, in the working series will be understood by an inspection of Fig. 28, as each pair or set is substantially similar in general style and manner of driving. The bearings $n$ for the axle N of one roll of the pair are fixed in the housings G, while the bearings $m$ for the axle N$^x$ of the other roll slide in the housing and are provided with a spring K and an adjusting screw L for forcing the rolls together.

The axles of each pair of rolls are united to turn in unison by intermeshing spur gears 4, and one of their horizontal axles is operatively connected by spiral-toothed gears 5$^x$ with an upright shaft 5 the lower end of which is united by spiral-toothed gears 6 with the main operating shaft 10, or a horizontal auxiliary shaft in geared connection with said main shaft. The arrangement of the roll-actuating gearing being similar for the several sets, some reference characters have been omitted from corresponding parts on the smaller scaled figures of the drawings which are similar to those of Fig. 28. The relation and functions of the several sets of rolls and combined elements are hereinafter explained.

At the head of the mechanism there is arranged a stand or frame A provided with means $a$ for supporting the supply-roll P of paper web or like fabric, and at its upper part, an obliquely disposed guide-bar or roller B about which the web is drawn and directed for advancement into the tube-forming means, which is supported upon the main frame or table; the web passing over said oblique guide preferably in such manner that the outer surface of the web on the supply roll P will form the outer surface of the completed envelope. The position and course of the web is indicated by dotted lines $p$.

For drawing the web at uniform speed from the diminishing or varying sized supply-roll, I provide a set of rolls D, journaled in housings upon the stand A, and driven, in unison with the tube-forming means, by a connection 10$^x$ from the main shaft 10, said connection being preferably universally jointed at $d$; thus permitting lateral adjustment of said stand, together with the parts supported thereon, in relation to the longitudinal alinement of the tube forming mechanism. The rolls D are constructed as best shown in Figs. 2 and 25, with parallel axis shafts 9, $9^1$ united by spur gears $9^x$, and with built-up body portions, removable but rigidly secured upon the axles, said rolls comprising, circumferentially, web-drawing sections $w$, preferably of semi-elastic material, annular creasing blades C and $C^1$ acting against elastic opposite surface rings $C^3$, circular shearing cutters E—$E^1$ adapted for trimming the respective edges of the web to give it exact width with parallel edges; these members being spaced and supported by intervening sleeve sections $v$, and confined by suitable collars and fastening means on the axle shafts. By changing the relation of the sleeve sections and blades these rolls are adapted for different widths of envelope-tubes. The housing $G^1$ for the journal bearings of the upper roll is provided with an endwise adjustable bolt or member L, having screw threaded ends and nuts $i^1$ thereon, and formed with an inclined top surface $i$ upon which the bearing-box $h^1$ of the upper roll is seated (see Fig. 26). The bearing of the lower roll may be supported at fixed position as at $h^2$. By endwise movement of the member L, the distance apart of the roll axles may be slightly varied thus regulating the draft-roll pressure to accommodate light or heavy paper. A set screw J in the housing cap serves to retain the bearing-box firmly down upon the inclined surface of the member L.

The axle of the roll is best connected with its operating shaft by a friction coupling $d^2$ provided with means $d^3$ for adjusting the degree of friction tension; thus while the rolls D are operated in unison with the draft-rolls 14 said rolls D are permitted more or less drag, to maintain a desired amount of tension on the web $p$ between the web-drawing rolls D and first fold laying draft rolls 14. The amount of such tension can readily be regulated to meet different conditions of working, by said coupling, as desired.

Numeral 12 indicates the tube-forming means, consisting of a peculiar shaped longitudinally alined sheet metal guide having an inwardly tapered mouth, a straight fold-guiding edge parallel with the line of travel, for directing the fold of the web at the median crease $c$ formed by the rolls D, a flat interior tongue $12^x$ and top and bottom members (see Figs. 18, 19 and 20) that embrace the upper and lower plies of the tube, bringing the same, at the latter end of said guide, into approximately horizontal plane relation and close together. The upper member has lateral width less than the lower member by an amount equal to the width of the desired lap of the closing seam. The folder guide 12 is supported upon a suitable bracket 13 standing upon and secured to the table or frame. Adjacent the end of the folder guide 12, and horizontally alined therewith, is a first pair of fold-laying draft-rolls 14, which serve for advancing the folded web and for pressing the two plies together.

A gum-box or receptacle 15 for containing a supply of adhesive material is arranged above the path of the folded web near the draft-rolls 14. Said gum-box is provided with a gum-delivery roll rotatable therein by gears $15^a$ and with a narrow transfer-roll 16 mounted upon a vertically swinging arm and adapted for transferring a film of gum from the delivery-roll to the face of the seam-gummer roll 17, which serves to deposit a line of gum along the margin of the broad fold or upper ply of the folded web, as it advances from the draft-rolls 14. The gummer roll 17 and its underlying bed-roll $17^x$ are arranged as a pair, their arbors being of full uniform length and provided with intermeshing gears and spiral toothed driving gears of the arrangement and character such as employed for other rolls in this machine. The gummer roll is narrow faced and its axle is provided with two roller disks 7 that contact with the underlying bed-roll at or near the ends thereof for keeping the axles of the pair parallel with each other. The under roll $17^x$ of the pair serves as a support for the flat folded web while passing beneath the seam-gummer roll 17.

At a short distance from the gummer roll 17 there is a means for folding over the narrow laterally projecting edge of the web and laying it down upon the gummed margin of the first laid broad fold which forms the upper ply of the tube. Said means comprises a stationary guide 18 in flatwise relation to the path of the tube; one edge of said guide having a longitudinally straight lip that embraces the primal fold line, while its other edge is provided with a hemmer lip or upstanding twist formed flange $18^x$ adapted for turning the narrow edge or hem over upon the gummed margin thus closing the envelope tube as it continually advances.

At the latter end of the guide 18 there is a pair of feed-rolls 20 into the bite of which the tube is delivered, at its normal plane, from the guide. Said rolls serve to press the gummed seam; assist in propelling the tube; and for establishing a position at which the advancing tube is constantly supported in flatwise relation at what may be termed its primary or given plane.

At a convenient distance from the rolls 20, I provide means for transposing or changing the flatwise plane relation of a portion of the closed tube from the primary or horizontal plane to a vertical plane, or to a position approximately perpendicular to its primary plane relation, without rotation of the tube, and while said tube is advancing. As illustrated this transposing means consists of a stationary funnel or tubular conduit 21, of the desired length, made of sheet metal or equivalent material, and formed to surround the envelope-tube; the shape of said funnel being approximately similar to that which might be developed by a given length of tube stretched from a transverse horizontal line to a transverse vertical line. The general contour of this funnel guide is such as will suitably embrace and support the envelope-tube while passing therethrough, receiving said tube flatwise from the horizontal rolls 20 and delivering it, at the latter end of the funnel with its flatwise relation transposed to a vertical plane. The mouth of the guide funnel 21 is best of a flat oval shape, more or less flattened horizontally, (see Fig. 21) its lateral width being equal to or slightly greater than that of the envelope tube; its central portion has an approximately round cross-section, (see Fig. 22), while its latter end is shaped as a vertically flat exit-way (see Fig. 23), the vertical dimension thereof suitably corresponding to the width of the transposed tube.

Near the end of the funnel guide there is preferably arranged a pair of lateral feed-rolls 23 acting against the vertically flattened tube through openings O in the sides of the guide funnel (see Figs. 1, 2 and 23). Said rolls are fixed upon upright shafts 23$^x$ journaled in bearings on brackets 22 attached to the table-plate 2$^x$. Said shafts are rotatively united by spur gears 24 and operated by spiral toothed gears 24$^x$ from the shaft 11 that received its motion through gears 11$^x$ from the main shaft 10. The vertically flat portion of the funnel 21 preferably extends with its sides parallel for some distance beyond the feed-rolls 23, the convergent lateral taper terminating adjacently forward of said feed-rolls. The guide conduit or funnel 21 is supported by a suitable bracket 21$^x$ standing upon and secured to the table-plate 2$^x$. Said plate has an open center to accommodate the upright shafts that extend therethrough. The plate 2$^x$ is preferably movably seated on the main frame, so that it, together with the mechanisms thereon, can be adjusted nearer to or further from the following mechanism to facilitate making different sizes of envelopes.

The term "blank" or "blanks" is used in this specification to designate the partially formed envelope, after the waste section has been removed from the advancing tube, and for the detached envelope forming piece previous to the final folding operations.

Adjacent to the exit end of funnel 21, I provide means for cutting out and removing a waste section from one edge of the transposed plane of the envelope tube; said waste section being of such size and shape as will give open-ends for the envelope blanks and leave uncut a portion of the tube fabric, of suitable area and form, sufficient for the united end-flaps, for the completed envelope. The preferable construction of this means is illustrated in detail in Figs. 4, 5 and 6, where 25 indicates the plain faced roll arranged upon an upright shaft 25$^x$ journaled in bearings on a bracket 26 standing upon and secured to the table. The lower part of said upright shaft 25$^x$ is coupled by spiral toothed gears 27 with a horizontal shaft 27$^x$ that is connected by suitable gears with the operating shaft 10. A cutter roll 30 co-acts with the roll 25 and has its shaft 30$^x$ journaled in a movable jaw 28 that is slidably mounted in a supporting bracket 29 secured to the table plate 2$^x$ in opposite relation to the bracket 26. The jaw 28 is sustained by upper and lower guides and has a projecting member 28$^x$ fitting into a recess in the bracket, suitable means, as a strong push spring, or a rigid pressure screw, being provided at its end 29$^x$ for forcing the cutter-roll 30 against its bed roll 25 with the required degree of pressure for effective cutting action. The cutter roll is best made of smaller diameter than the bed roll 25 and is furnished with a hardened blade 31, of the desired outline shape, projecting from its surface and contacting with the face of roll 25. The contact occurs at a different part of the bed roll surface at each revolution, owing to the difference of diameters of the two rolls.

It is designed that the cutter-roll may be changed for making envelopes of different size, a larger or smaller roll, or one having a different shaped blade 31 being substituted. This can be done without disturbing or removing the bed roll 25 from its position. The axle or shaft 30$^x$ of the cutter-roll 30 extends below the table and is stepped in a sleeve 32 that turns in a bearing carried by a bracket 33 supported upon a supplemental frame 34, and provided with facilities for its adjustment toward or from the shaft 25$^x$. The two roller shafts are operatively connected by spur-gears 35—35$^x$. The lower end of the cutter-roll shaft is preferably coupled with the sleeve 32 by an intermatching transverse lug and groove at 32$^x$, so that the shaft can be readily removed and replaced without releasing the sleeve 32 from its bearing, when it is desired to change the cutter roll 30 for one of different size or pattern. The joint at 32$^x$ is best formed by a grooved step piece inserted within the sleeve and retained by a transverse pin therethrough, as shown on Fig. 4. To change the cutter devices for different size of envelopes, the roll 30, its shaft 30ˣ and gear 35, are removed by loosening the bracket 29 and lifting the end of the shaft from the sleeve 32, then substituting upon the shaft a cutter roll 30 of the diameter required and a gear 35 of corresponding dimension, then replacing the shaft in position and securing the parts. The roll 25, its shaft and gear 25ˣ do not require any particular attention when making this change.

The housing H for the spiral gears 27 is, in the present instance made to embrace the upright and horizontal shafts 27ˣ in such a way as to serve as a journal bearing for both shafts without necessitating a fixed bearing-box for the foot of the upright shaft, and so as to permit the shifting of the spiral gear 27 longitudinally along the drive shaft when desired.

Adjacent to the cutter rolls I provide a scrap discharger, comprising in the present instance, a transversely disposed reciprocating bar 36 arranged in a suitable guide 36ˣ, and actuated by a revolving cam 37 and a retracting spring 37ˣ (see Figs. 5 and 6). A depending guard or deflector member 38 is arranged adjacent to the path of the envelope-tube, at the side opposite to that occupied by the discharger or bar 36, and so positioned that when said bar is shot forward by the revolving cam, which is effected at practically the same time as the cut is being made by the rolls 30—25, the bar 36 pushes or directs the cut out section from the path of the tube, so it will pass at the opposite side of the guard 38; hence the cut out waste-section is positively separated from the tube and falls into a suitable receiver or chute 39 arranged to receive and conduct it away, or prevent it from falling among the machinery. The discharger actuating cam 37 is fixed upon a shaft 40, operated by sprockets and chain 41 from a shaft 11 beneath the table; or in other convenient manner.

The central plate 2ˣ of the table is best arranged so that said plate together with the mechanisms mounted thereon, can be shifted to a limited extent, longitudinally upon the frame, in respect to the general working alinement, to accommodate the making of envelopes of different lengths.

Following the waste-ejecting devices I provide means adapted for restoring the flatwise transposed tube back to its normal or primary given plane, and directing said tube between the succeeding draft-rolls 44 that assist in advancing the tube. Said means consist of a guide 43 vertically converging towards its exit end, which terminates adjacent to, and in alinement with the bite of the rolls 44, that are mounted and operated in substantially similar manner to that hereinbefore described; that is by an upright shaft and spiral toothed gears from an underlying horizontal drive shaft.

A pair of rolls 45 and 45ˣ, one of which is provided with a cutter blade or blades 45ᶜ are arranged for detaching the envelope blank F from the end of the advancing tube, by a cut or division across the single ply portion left for the production of the flaps f and fˣ, by the removal of the waste section as above specified. The cutter blade may be straight or curved as desired, to give the required outline contour for the end of the flaps when separated. The rolls 45 and 45ˣ are arranged with shorter arbors, but are mounted, geared and operated substantially the same as hereinbefore described, by spiral toothed gearing 5ˣ—6, and upright shaft 5 (see Fig. 28), so as to have a surface speed uniform with the draft rolls 44.

47 indicates a pair of rolls one of which is provided with creasing blades e adapted for forming the transverse creases across the blank at the position where the flaps are to be subsequently folded. The lower or bed-roll for the creasing pair preferably has an elastic surface 47ˣ, or it may be provided with grooves for co-matching with the creaser blades.

48 indicates a propelling roll, the axle of which is journaled in an upwardly and downwardly swinging hanger 49 the end of which is pivotally supported upon the shaft of the creaser-roll 47. Said propelling roll is operated at a higher degree of surface velocity than that of the creaser-roll and preceding draft-rolls, and is designed to project the detached blank away from the succeeding blank, or end of the tube, with a quick impulse. The roll 48 is, in the present instance, driven by a sprocket chain 50 from a sprocket fixed on the creaser-roll axle, the proportional speed relation being approximately one to two; or as may in any instance be desired.

Below the roll 48 there is arranged a plate 51 extending from the bite of the creasing rolls 47 (see Fig. 8) and having a roll 52 at its latter end which co-acts with the propelling roll 48 for passing the detached blanks individually to a position where their endwise advancement is arrested, and from which position the blanks are individually taken in successive order by a plurally equipped carrier 54 and transferred laterally to the final gumming and flap-folding mechanisms.

Figure 3:
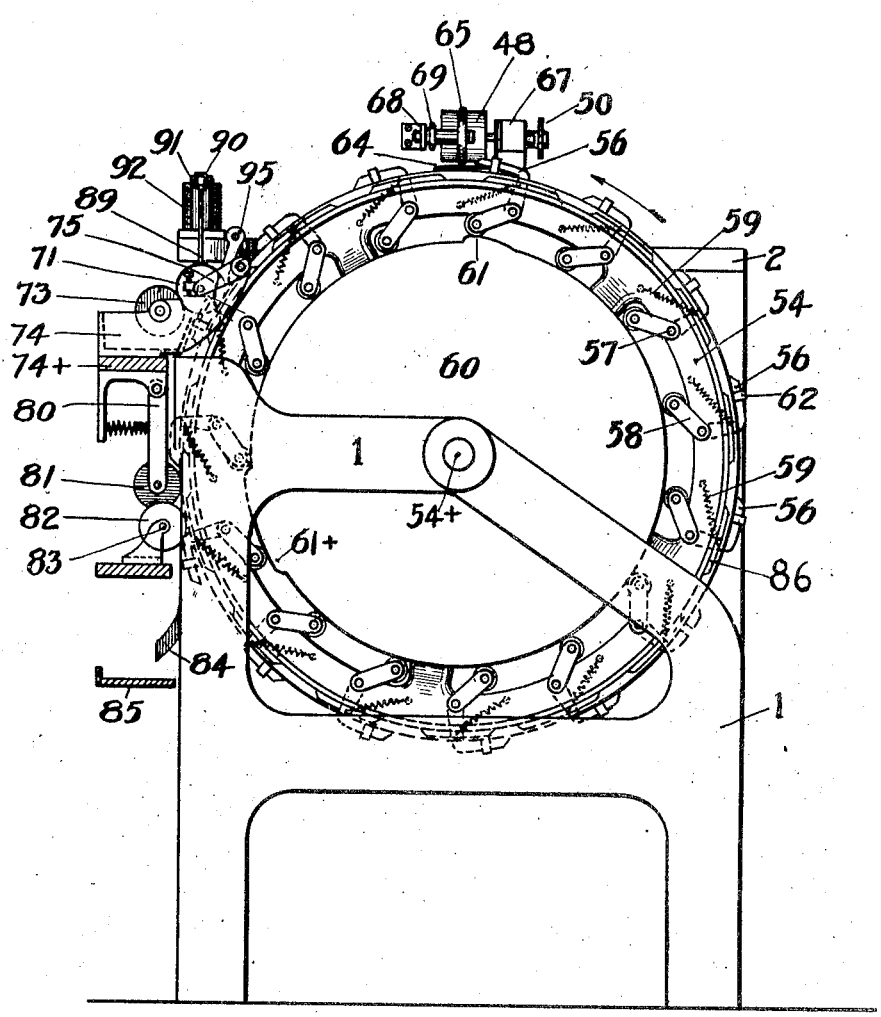
Fig. 3 is an end view of the machine showing the transversely disposed carrier and accompanying mechanisms.

The transferring carrier 54 consists of a cylindrical drum, wheel, or revolvable element, presenting a broad rim transversely disposed in relation to the tube alinement, and having its axis shaft 54ˣ supported in suitable bearings upon the frame; said axis being approximately parallel with the direction in which the tube has traveled in the machine. The peripheral face of the carrier 54 is apportioned for a predetermined number of receiving places or divisions, say fifteen, more or less, as may in any instance be found desirable. At each of the divisions there is arranged a pair of forwardly projecting grip-fingers 56 each pair uniformly mounted upon a rocker shaft 57, journaled within the carrier rim 54, parallel with the axis shaft. The grip-fingers project out through openings in the rim and their offset ends are adapted to close down upon the exterior surface thereof as indicated. Each rocker-shaft has an arm 58 fixed thereon, the outer end of which is furnished with an antifriction roll that runs upon the surface of a stationary cam 60, the center of said cam being coincident with the axis of the carrier, as best shown in Fig. 3. Suitable springs 59 are provided for pressing the arms towards the cam and keeping the grip-fingers normally closed. At predetermined positions the cam 60 is provided with a protuberance or swell, 61 and 61$^x$, adapted for positively lifting the grippers at the positions for taking the blank F, and for releasing the finished envelope.

Each of the grip-fingers 56 is best provided with an offset or gage-block 62 thereon, against which the lateral edge of the blank contacts, for giving the true position or register, as it takes direction with the carrier. The gage-blocks 62 are preferably adjustable upon the grip-fingers to accommodate different widths of blanks.

The exterior of the carrier cylinder is provided with seat plates or facets 55 at positions where blanks are received thereon. Said facets are preferably elevated about one-sixteenth inch more or less, above the general surface of the cylinders, and are disposed to approximately correspond with the position and area of the flaps on the respective ends of the blank; these facets serve as pressure beds when the flaps are passing under the flap-gumming rolls and fold laying means.

The series of facets or seats 55 for sustaining the flaps at one end of the blank upon the carrier are best affixed to a ring or band 55$^x$ concentrically mounted upon the carrier rim in a manner to be adjustable in a direction parallel with the carrier axis, so that the full set can be adapted, at a single adjustment, for blanks of different lengths; said ring being provided with suitable means for securing it at adjusted positions.

At the junction where the movement of the detached blank is changed from a direct longitudinal advancement to edgewise lateral transference, there is arranged means for arresting, and for regulating the individual blanks. For this purpose I provide a stationary plate or rest 64 arranged adjacent to and extending over the carrier 54 in crosswise relation thereto, and approximately in alinement with the plate 51 and the roll 48, (see Figs. 7, 8 and 9). Said rest-plate is constructed to form a horizontal bed upon which the tubular blank may be positioned for correct register. An end-barrier 66 is provided against which the blank impinges as it is projected free from the roll 48, the direct forward advancement of the blank being thus arrested and its position upon the rest 64 suitably gaged. Said end barrier is preferably made with an inwardly overhanging top portion (see Fig. 8) to keep the end flaps well down upon the rest in case the fabric has any tendency to curl upward. The rest is supported by a bar 64$^x$ along one side thereof. The rest 64 is provided with suitable transverse slots $s$ to allow the grippers to pass through without contacting therewith. A small upwardly inclined finger $k$ may be arranged to prevent the leading end of the blank interfering with the edge of the slots or with the passing grippers. The bar 64$^x$ prevents the escape of the blanks in reverse direction; but the structure is laterally open in the direction the carrier travels; so that the blanks are readily taken therefrom by the grip-fingers 56. The rest-plate mechanism may be supported by an arm or bracket 67 attached to the frame or table; or its support can be arranged in any efficient manner as desired.

Above the rest plate 64, I provide an operated disk-like roll 65 the periphery of which is preferably quite narrow, or convexly rounded as indicated in Fig. 7. Said roll is adapted to rest by gravity upon the top surface of the blank deposited on the plate 64, so that while said roll tends to propel the blank forward its contact and friction is sufficiently slight to permit the roll to slip on the surface when the end of the blank contacts with the barrier 66 or meets a sufficient degree of opposition.

The roll 65 turns upon an axis-stud fixed to an arm 68 mounted upon the bearing of the roll 48, or other convenient support; and is rotatively operated by a band 69 arranged about a pulley 69$^x$ on the roll-bearing sleeve and running from a pulley on the axle of the roll 48. The arm 68 is so arranged that the roll 65 can have vertical movement but no sidewise movement; therefore, with the roll pressing lightly upon the top surface of the blank while the grippers approach for seizing the blank, the crosswise friction on the face of the roll 65, and the movement of the carrier and grip-fingers 56 effects uniform line-up of the edge of the blank against the front of the offsets or gage-blocks 62 on both grip-fingers of the pair, just before said grip-fingers are closed down for positively seizing the blank; thus the blanks, at the place of their lateral transfer, are caused to assume a correct register position as they are taken by the laterally moving carrier for presentation to the flap-gumming means.

The final gum-applying and flap-folding mechanisms are disposed in successive order adjacent to and for co-acting with the carrier 54 (see Figs. 3, 11 and 12). Upon a suitable shaft 70, arranged parallel with the carrier surface, are two narrow gum-transfer rolls 71 and 72, one for gumming the bottom flap; the other for gumming the sealing flap of the blanks. These transfer rolls are charged with gum from gum-delivery rolls 73 that rotate within a gum-box or reservoir 74. The film of gum may be gaged by a scraper in well known manner. The gum-box is supported on a bar 74ˣ fixed to the frame. The shaft for the transfer rolls 71 is journaled in swinging arms 75 that permit of the rolls being swung toward and from the face of the carrier 54, by suitable actuating means, as hereinafter explained.

The blanks, held upon the carrier, with their end flaps extended upon the facets 55, are caused to pass under the rolls 71 and 72, which respectively roll across the flaps transferring a coating of gum to so much of their surface as may be desired.

Stationary curved guards 76 and 76ˣ are arranged for keeping the blank, at its crease lines, close to the face of the carrier while the folding is effected. Said guards are attached to the bar 74ˣ. The fore end of the guard is best bent outward to insure of the blanks passing beneath it.

Spirally flanged guides 77 and 78, fitting the curvature of the carrier, are arranged near the guards 76—76ˣ, and respectively formed with twist shaped flanges; one 77 for folding and laying the bottom flap, the other 78 for folding the sealing flap.

80 indicates a spring-pressed arm supporting a roller 81, preferably of elastic material, or having a yieldable face and adapted for pressing down the folded bottom flap fˣ. The sealing flap f is folded over but not pressed close enough to adhere to the body of the envelope.

82 indicates a discharging roll or brush of suitable material, mounted upon a rotating shaft 83 and operated by a belt or equivalent means from any convenient part of the machine, the function of said roll being to remove the finished envelope from the carrier 54 when the grip-fingers are released by the swell 61ˣ of the cam 60, and to pass the finished envelopes by way of a suitable guide 84 to a traveling horizontal receiving belt or dryer 85 upon which they are successively deposited with their sealing flaps f in position to permit the gum thereon to become properly dried as they are carried to any desired position for packaging; the movement of the belt 85 being sufficient to afford ample space between the successive envelopes as the sealing flaps of successive envelopes as deposited upon said belt. The receiving-belt or dryer 85 and means for operating the same may be of any approved construction.

Upon the exterior of the carrier cylinder 54 I arrange a series of cam surfaces, detents or bars 86 that engage with a roller mounted in a swinging lever 87 fulcrumed on the axle of the gum delivering roll, or other suitable pivot, and adapted to control the transfer-roll 71 (see Fig. 13) by keeping said roll from gumming contact while the lever 87 is raised by a bar 86, but permitting the gumming rollers to contact with the flaps while the intervals between the bars are passing the end of the lever. By this means a given portion of the flap, more or less, may be gummed without extending the gum to the extreme edge of the flap, thus avoiding liability of extrusion of gum at the edge when passing under the presser roll 81.

To avoid the depositing of gum or adhesive matter when no blank is in position to receive it, the shaft of the gum applying rolls which is journaled in swinging bearing arms 75, is connected by link 89 with a fulcrumed lever 90, one arm of which forms or carries the armature 91 of an electromagnet, or magnets 92 supported at a convenient position. Around the cylindrical carrier 54 there is arranged a track T composed of alternately disposed non-conducting surface 93, and electrical conducting surface 94, the latter being coincident with the positions normally occupied by the blanks upon the carrier. A swinging arm or brush 95 is arranged to drag upon said track. An electric circuit is arranged through the magnets 92, brush 95 and surfaces 94 upon the carrier 54; which circuit is closedy and broken, as the carrier revolves, accordingly as the surface 94 is in or out of contact with the member 95. When the machine is in operation and blanks are delivered to the carrier in regular order the respective blanks shield the conducting surfaces 94 and prevent contact therewith of the brush 93, then no energizing of the magnet occurs; but if a blank is not delivered on the carrier then the brush can contact with said conducting surface closing the circuit through the magnets which draws down the armature and thereby lifting the gumming rolls 71—72 away from the face of the carrier.

The lower member or sleeve 32 of the cutter-roll shaft 30ˣ is connected by beveled gears 97 with a transverse shaft 98, which in turn is connected by spiral toothed gears 99 with a longitudinal shaft 100 supported in suitable bearings upon the under frame 101 (see Fig. 4). Said shaft 100 is connected at or near its rear end, by spiral-tooth gears 102, with a short upright 103 provided with a worm screw that engages with a worm wheel 105 fixed on the axis-shaft 54× of the carrier 54, thereby imparting rotative movement to said carrier, the timing of the mechanism being such that the carrier rim moves one space at each operation of the envelope-blank producing means. By this arrangement the operation of the carrier is combined with the operation of the waste-cutting roll in such a manner that when the cutter roll 30 is changed for different sizes of envelopes, a corresponding movement of the carrier 54 results therefrom without necessitating readjustment of the carrier-drive gearing. The relatively slow rotation of the carrier in respect to the blank forming actions, affords ample time for completion and discharge of the envelopes, whatever the degree of rapidity at which the blanks are produced and delivered upon the rest plate 64 or placed for lateral transfer.

A hand-wheel W may be arranged at the front of the frame with its shaft connected by suitable gears with the main shaft 10 of the machine, to facilitate temporary movement thereof by hand when desired.

The operation is as follows: the web of paper, from the supply roll P mounted upon the stand A, is passed between the pair of rolls D comprising the edge-trimming, creasing, and feed draft members, by which the web $p$ is reduced to a required width with exactly parallel edges, and the longitudinal creases $c-c^1$ simultaneously formed therein for indicating the tubular foldings; also, said rolls D serve to draw the web at a regular speed from the gradually diminishing roll P. The web $p$ then passes under a guide roll $b$ upward and around the oblique guide B, and thence through the tube-former guide 12 by which the broader fold, at the crease $c$, is laid over upon the main part of the web. The dual plies then pass between the first fold-laying draft-rolls 14, pressing the two plies in close flatwise relation. The once folded web then passes beneath the gum-applying means 17 by which a line of gum is deposited along the margin of the broad fold; thence through the hemmer guide 18, by which the narrow edge fold is laid over upon the gummed margin, thus producing the closed envelope-tube which is pressed and sustained flatwise at primary plane relation, by the second fold-laying draft-rolls 20. The tube then passes through the transformer 21 whereby its flatwise plane is transposed to a perpendicular position; thence through the cutter mechanism 25—30 whereby the folded waste section is removed from one edge of the transposed tube. It is then caused, by the guide 43, to assume its primary plane; thence through the feed-rolls 44 to the cutter-roll 45 which completely detaches the blank from the end of the tube. The detached blank is then creased for the flap-folds by rolls 47 and sent forward to the propelling roll 48, by which it is projected upon the rest-plate 64; from which latter it is taken by the laterally moving carrier means, as hereinbefore described, and subjected to the final flap-gumming and folding devices and the complete envelope is released at the predetermined position.

It may be noticed that in the organization of this machine the working movements are chiefly rolling actions and practically continue operation in one direction or order; these being driven by spiral gearing which operate smoothly and silently. There are no heavy reciprocating parts with intermittent actions, nor reciprocative reversements, or unbalanced ponderance. Therefore, this machine can be operated at comparatively high speed, and without creating the noise and clatter incident to the running of most envelope machinery; while the power required for its operation is much less than that required for running the usual envelope making machines.

It is understood that the idea, broadly, of forming a continuous tube from a paper web and producing envelopes from the end of said tube, irrespective of the manner and means employed therefor, is not at the present time new in the art; but, so far as I am aware, mechanism of the character herein described and claimed has not been heretofore disclosed prior to my invention.

What I claim is—

1. In an envelope making machine, in combination with means for supporting a roll of paper web, means for guiding and longitudinally folding the web to form a closed envelope-tube and means for making envelopes from the end of said tube; of means for primarily pulling the web from the supply-roll, consisting of a pair of co-acting rolls having parallel axle shafts and circumferentially providing semi-elastic feed-draft sections, crease forming blades acting against opposed elastic faces, intervening sleeve-sections, and circular shearing cutters adapted for trimming the edges of the web, said members being removable but rigidly secured upon the axle shafts, said rolls adapted for delivering the web at substantially uniform tension.

2. In an envelope machine of the character described, in combination with means for supporting a roll of paper web, means for guiding and folding the web into tubular envelope form, and means for producing envelopes therefrom; of means for uniformly delivering the web from the supply roll, consisting of a pair of coacting rolls having parallel axial shafts, and provided with comating feed-draft surfaces, crease forming members, and circular shearing cutters adapted for trimming the respective edges of the web, the bearing housings for said roll shafts provided with means for regulating the distance apart of the axes.

3. In an envelope making machine, means for supporting a roll of paper web, means for guiding and longitudinally folding the web, a pair of first fold-laying draft-rolls, means for closing the envelope-tube, and means for producing envelopes from said tube; of a primary pair of web-drawing rolls comprising feed-draft sections, crease-forming blades, and edge-trimming cutters, bearings for the roll axles, housings therefor, inter-meshing gears on the roll axles, a frictional coupling connecting one of said roll-axles with its operating shaft, and means for adjusting the friction thereof, for regulating the tension of the web between said web-drawing rolls and first fold-laying draft-roll.

4. In a machine for making tubular envelopes, in combination with means for supporting a roll of paper web, means for guiding and forming the web into a flat envelope tube, and means for making envelopes from the end of said tube; of a primary pair of web-drawing rolls comprising web-feeding members, crease-forming members, intervening sleeve sections, and circular edge-shearing cutters, said members adapted to be arranged in different relative positions along the roll axles, and means for rigidly securing said parts thereon.

5. In an envelope making machine, the combination with means for supporting a supply-roll of paper web, means for forming a continuous closed tube therefrom, feed-rolls for advancing the tube, and means for producing envelopes from said tube; of a pair of draft-rolls for feeding the web from the supply roll, said draft-rolls provided with draft-surfaces, crease-forming rings, and circular shearing cutters for trimming the edges of the web, a drive-shaft extension for operating said rolls provided with universal-joint connections, an adjustable friction sleeve coupling uniting the drive shaft to the draft-roll arbor, and means for regulating said coupling for controlling the tension on the paper as delivered to the tube-forming mechanism.

6. In a machine for making tubular envelopes, in combination, means for delivering, longitudinally creasing and directing a web of paper or the like, including a pair of rolls having creasing members and feeding members consisting of assembled removable rings, a flatwise tapered tube-forming guide comprising upper and lower portions united to form a guiding edge disposed parallel with and for the direct alinement of one edge of the envelope tube, a tongue within said guide, its edge along its rear portion disposed in parallel relation with said guiding edge and tube alinement, fold-laying draft-rolls adjacent the exit of said guide, means for depositing adhesive upon the margin of the primary fold, a second guide having means for turning and closing the opposite edge of the web over upon the margin of the primary fold, a second pair of fold-laying rolls, means for operating the several pairs of rolls, and means for maintaining a desired tension of the web between the delivery rolls and tube-forming guide.

7. In an envelope making machine, in combination with means for supporting, creasing and delivering a web of paper, means for forming a continuous envelope tube, consisting of a primary fold-forming guide comprising upper and lower members united at one side on a line parallel with the line of travel and adapted for longitudinally laying a broad transverse fold, a first pair of fold-laying draft-rolls at the end of said guide for pressing said fold, an overlying gum-device including a transfer-roll that spreads a line of gum along the margin of said broad fold, an adjacent hemmer-guide having a flange adapted for turning a narrow fold over onto the gummed margin, a second pair of draft-rolls at the end of said hemmer guide for pressing the gummed seam and for supporting the closed envelope-tube at a given plane.

8. A machine for making tubular envelopes, comprising means for transforming the flatwise plane of a continuous moving closed envelope tube to a plane approximately at right angle to its original plane, means for removing a waste section at one edge of the transformed portion of said tube, means for then restoring the plane of the tube to its original flatwise relation, and means for severing envelope blanks from the end of the envelope tube.

9. In a machine for making envelopes from a continuous formed tube of paper or the like, the combination, with a preceding pair and a succeeding pair of draft-rolls located at suitable distance apart and respectively adapted for supporting the envelope-tube on a given plane; of intervenly located tube-transposing elements adapted for transposing the flatwise plane relation of a portion of the advancing envelope-tube to a plane approximately perpendicular to said given plane, mechanism adjacent the transposed portion of the tube for cutting out a section from one edge thereof, at intervals according with the length of the required envelope, cutter mechanism for detaching the blanks from the end of the tube at the outline for the ends of the flaps and means for propelling the detached blanks away from said cutters.

10. In a machine for making tubular envelopes, means for forming a longitudinally closed flat tube from a web of paper or the like, means for transversely supporting the flatwise relation of said tube at a given plane, a laterally convergent vertically divergent guiding element adapted for transporting the flatwise relation of the tube to a plane approximately perpendicular to its original preceding plane, means for cutting out a folded section from the edge of the transposed tube, means for advancing the tube, means for restoring the flatwise relation of the tube to its original plane, means for severing envelope blanks consecutively from the end of the tube, and mechanism for the final creasing, gumming and folding of the flaps.

11. In an envelope machine of the character described, the combination with means for forming a closed flat tube from a web of paper or the like, means for advancing said tube, and means for detaching open end envelope blanks from the end of said tube; of an intermediately located means for temporarily changing the flatwise plane of the advancing tube to a plane approximately at right angles to the primal plane, without rotation of the tube and without deviation of its direct axial alinement; said means comprising a stationary tube-supporting element having directing surfaces adapted to impart a combined laterally convergent vertically divergent effect to the plies of the tube while passing from the fore end to the latter part of said element, and means for cutting a defined section from the fold edge of the tube while in such changed relation.

12. In an envelope making machine, means for forming and advancing a closed envelope tube of paper or the like, a tube transporting means comprising a stationary guide-funnel through which the envelope-tube passes, said guide-funnel being shaped laterally convergent from its front end and vertically divergent towards its latter end in approximate conformity to the shape assumed by the envelope tube therein, said tube entering the guide-funnel horizontally flatwise and issuing therefrom vertically flatwise, a pair of feed-rolls near the latter end of the guide-funnel acting upon the transposed portion of the tube through openings in the opposite sides of the guide, means for removing a section from the tube as it issues from said guide-funnel, consisting of a pair of rolls one of which is provided with a suitably shaped cutter, a movable support for said cutter-roll, means for pressing said cutter-roll against the opposite roll, means for operating said rolls, and means for restoring the tube to its normal flatwise plane after the waste-section has been eliminated.

13. In an envelope making machine, the combination with means for transposing the flatwise plane of a continuous-formed envelope tube; of means for cutting a waste-section from said tube, consisting of a pair of coacting rolls including a cutter-role and a bed-roll therefor, a movable yoke having the axle of the cutter-roll journaled therein, gears operatively connecting the roll axles, the cutter-roll axle united with its lower member by an interlock joint that permits ready removal for exchange of cutter-rolls for different sizes of envelopes; means for operating said rolls, means for supporting the bed-roll and cutter bearing yoke, and means for forcing the yoke and cutter toward the bed-roll.

14. In an envelope making machine, the combination with means for advancing an envelope tube, means for transposing the flat-wise plane of said tube to a plane approximately at right angle to its original plane, means for cutting a waste-section therefrom, and means for positively deflecting the waste-section scrap from the path of the advancing tube.

15. In an envelope making machine, comprising means for forming a flat closed envelope tube from a web of paper, and means for longitudinally advancing said tube; the combination, of means for transposing the flatwise plane of the advancing tube, means for cutting a waste-section therefrom, a waste-ejector device including a pusher-member adapted for contacting against the waste-section as it is being cut out, forcing it laterally from the plane of the tube, and means for actuating said pusher-member.

16. An envelope making machine, comprising means for producing a continuous closed envelope-tube, means for propelling said tube a guide adapted for transposing the flatwise relation of the advancing tube from its original plane to a plane approximately at right angle thereto, an adjacent pair of driven rolls coinciding with the latter plane, one of said rolls having a cutting means formed for cutting from the transposed plane a section approximately one half the width of the envelope tube and of a length equal to the united length of the envelope-end flaps, leaving connected the portion for forming said flaps, means alined therewith for restoring the flatwise relation of the tube to its original plane, a pair of tensioning draft-rolls between which the tube is passed, roller means for cutting apart the ends of adjoining blanks, means for creasing the flapfold lines. rolls for propelling the detached blank forward at increased speed, a supporting rest whereon the blanks are individually deposited and their longitudinal advance arrested, a moving carrier provided with a plurality of sets of mechanism adapted for successively taking individual blanks laterally from said supporting rest, and means co-operating with said carrier for successively completing and discharging the envelopes.

17. In an envelope making machine, the combination with means for transposing the flatwise plane of a continuously formed envelope tube, means for cutting a section from the transposed tube leaving approximately its half width uncut, and guiding means for re-transposing the flatwise relation of the tube to its normal plane; of a pair of draft-rolls at the exit of said guiding means, an adjacently located pair of rolls one of which is provided with cutting means for detaching an envelope blank from the tube transversely across the flap-forming ply, another pair of rolls one provided with blades for creasing the flap-fold lines, a following blank-propeller roll journaled on a vertically swinging arm supported on the creaser-roll axle; a sprocket and chain connection for operating the propeller-roll at greater surface speed than the preceding rolls, a support for directing the blank between the creaser-roll to the propeller-roll, a positioned rest-plate receiving the blank from the propeller-roll, an end barrier to arrest the direct endwise movement, an alined disk-like roll having a narrow peripheral face, a supporting arm therefor attached to the propeller-roll bearing, means for rotating the disk-roll from the propeller-roll axle, and a carrier mechanism provided with a plurality of members for taking blanks laterally from their arrested position.

18. In a machine for making tubular envelopes, in combination with means for producing tubular blanks with oppositely projecting flaps, and for advancing the same to a predetermined position; a transversely disposed revolvable carrier provided with a series of dual gripping-devices thereon adapted for taking individual blanks laterally from said predetermined position, flap-gumming means, and flap-folding means to which the blanks are successively presented by said carrier, means for closing and opening said gripping-devices at positions for taking the blanks and for releasing the folded envelope, and means for rotating the carrier.

19. In an envelope making machine, the combination with means for producing tubular envelope blanks having projecting end flaps from a flat closed tube of paper or the like, means for longitudinally propelling said tube, means for severing the blanks from the end of the tube, means for individually advancing the detached blanks to a predetermined position at which their advance movement is arrested; of means including a successive series of blank-engaging members adapted for taking the blanks in successive order laterally from said arresting position and transferring them sidewise for further operations, and means for effecting the final gumming and flap-folding operations.

20. In an envelope making machine, in combination, with means for producing tubular envelope blanks with projecting end flaps and delivering said blanks longitudinally at a predetermined position, a revolving carrier-drum provided with a series of automatically actuated grippers adapted for engaging the edge of a blank at said predetermined position and transferring the blank laterally, a gum-supply mechanism including means for rolling gum upon the projecting flaps while supported upon the face of said carrier, means for folding the gummed flaps, means for retracting the gum-applying members, means upon the revolving carrier for controlling the gum-applying members, a stationary cam concentric with the carrier axis and adapted for actuating the respective grippers for taking and releasing the blanks, means for rotating the carrier, and means for removing the finished envelopes from the carrier.

21. In an envelope making machine, in combination with means for forming a closed envelope tube, means for advancing said tube longitudinally, and means for producing therefrom tubular-envelope blanks having projecting end-flaps, and individually directing said blanks to a predetermined position; of a revolvable cylindrical carrier its periphery moving adjacent to said position for receiving the blanks thereon, said carrier provided with a series of grip-devices severally adapted for successively taking the blanks in a direction approximately at right angle to their preceeding advancement and temporarily holding them upon the carrier, gumming mechanism for applying gum to the extended flaps while on the carrier, means moving with the carrier for controlling the gum-applier action for depositing gum only upon a desired portion of the flap surface, means for folding over the gummed flaps, means for rotating the carrier, means for actuating the grip-devices, and means for discharging the finished envelope from the carrier.

22. In an envelope making machine, comprising means for producing tubular blanks from the end of a continuedly advancing closed tube, means for cutting off, and individually propelling the detached blank to an arresting position, a positioned blank-receiving rest whereon the detached blank is deposited, said rest having slots for the passage of blank-engaging members, a revolvable carrier drum its periphery apportioned with a plurality of places for successively carrying individual blanks, blank-engaging members mounted upon rocking shafts supported on the carrier rim at each of said places each shaft provided with cam-engaging arm, a cam for actuating said members, said blank-engaging members each having a gaging offset thereon for abutting the edge of the blank laterally, a gum supply means including rolls for applying gum to the flaps of the blank resting upon said carrier, an elastic presser-roll adjacently following the gum applying roll, means for moving the gum-applying rolls into and out of contact with the blank, a series of detents on the carrier for controlling the gummer action, means for folding the flaps, and means for removing the complete envelope from the carrier.

23. In an envelope making machine, the combination, with means for making a closed flat tube from a paper web, means for propelling the tube longitudinally, means for transposing the plane of the tube, and cutting mechanism that removes a section from one side thereof to define a tubular envelope blank with connected end flaps; of means to re-transpose the tube to its normal plane, rolls to press the blank, cutter-rolls for detaching the blank from the end of the tube, means for creasing the flap-fold lines, means for propelling the blank individually to positioned rest, a transversely arranged carrier-drum its periphery apportioned to afford a series of blank-supporting surfaces with raised facets approximately corresponding to and for underlying the extended flaps of the tubular blanks, sets of dually arranged grippers pivotally mounted on the carrier-drum, a stationary cam for controlling said grippers, a positioned supporting rest adjacent to the carrier face and having slots for the passage of the grippers, means for stopping the direct advance of the blank upon said rest, means for rotating the carrier, and gumming and folding mechanism to which the blanks are laterally presented while held on the carrier-drum.

24. In an envelope making machine, in combination, with means for forming a continuous closed envelope tube from a web of paper or the like, and means for temporarily transposing the flatwise plane of a portion of the moving tube to perpendicular relation, mechanism for cutting a section from its temporary plane for producing tubular envelope blanks having extended end flaps from the end of said tube, means for detaching the blank, means for advancing the detached blank, and means for arresting the direct forward movement of the detached blank at a predetermined position; of a transversely disposed rotatable cylinder its periphery adapted for supporting a plurality of consecutively arranged blanks thereon, means moving with the cylinder for successively taking and temporarily holding the blanks thereon while laterally transferring them from said arrest position, means coacting with the face of the cylinder for gumming and for folding the flaps, means for rotating the cylinder, and means for actuating the blank-folding devices.

25. In an envelope making machine of the class described, the combination with means for forming a closed envelope tube, means for propelling said tube, and means for continuedly producing at the end thereof tubular envelope blanks having united projecting end flaps; of means for detaching and advancing the blanks individually to a predetermined position of rest, a transversely disposed rotatable carrier-drum, its exterior spaced for a plurality of blank-receiving areas each provided with flap-supporting facets slightly outstanding from the normal face of the drum, dually arranged grip-fingers for holding the blanks upon the respective areas with their flaps overlying said facets, means for controlling said grip-fingers, for successively taking blanks laterally from said position of rest to the place of discharge, a gumming means that rolls across the flaps lying upon said facets, stationary folders coacting with the face of the drum, and means for operating said mechanisms.

26. A machine for making tubular envelopes, comprising means for supporting a rolled web of paper or the like, means for drawing the paper from the roll and creasing it for longitudinal folds, means for guiding the web and producing a transverse primary fold therein, means for advancing the folded web, gumming devices adapted for applying a line of adhesive along the margin of said fold, a hemmer guide for folding the opposite edge of the web over upon said gummed margin, means for pressing the gummed seam and advancing the closed flat tube while supporting it flatwise at a given plane, means for transposing the flatwise relation of the tube to a plane approximately perpendicular to said given plane, means for removing a section the length of the desired flaps from one edge of the transposed tube, means for restoring the plane of the tube to its former flatwise relation, means for severing the blank from the end of the tube, rolls for feeding and transversely creasing the detached blank, means for arresting the direct endwise advancement of the blank at a predetermined station, a rotatable carrier provided with a plurality of devices for taking blanks laterally from said arresting station, flap-gumming and flap-folding devices near the periphery of said carrier whereby the blanks while on the carrier are gummed and folded, means for rotating said carrier, and means for actuating the devices for taking the blank and releasing the finished envelope.

27. In an envelope making machine, comprising means for producing tubular envelope blanks and delivering the same at a predetermined position, a rest for the delivered blank, a revolving carrier provided with a plurality of blank-receiving seats and dually arranged grip-fingers provided with offset guards thereon, means for rotating said carrier to cause the grip-fingers to take the blank laterally from the rest position, and means for slightly retarding its movement so as to position the edge of the blank parallel against the two offset guards as the grip-fingers close upon the blank, thus effecting accurate register for the blank as it is taken laterally from the rest position and passed to the final folding position.

28. An envelope making machine, comprising in combination, means for transposing the flatwise plane of a continuous forward envelope tube, means for cutting a waste section from the transposed portion of the tube, guides for restoring the cut tube to its normal plane relation, feed-rolls that act on the tube passing from said guide, means for forming flap defining creases, means for detaching the blank from the tube transversely across the uncut ply, rolls that advance the detached blank to a position of rest, a stationary supported rest-plate adapted for receiving the blank and having an end barrier for stopping its endwise advancement, an alining roll having a narrow convex periphery arranged above said rest-plate for contact with the surface of the blank thereon, a vertically movable laterally nonyielding support for said roll, means for rotating said roll, a transversely disposed carrier beneath said rest-plate having a plurality of means for successively taking blanks sidewise from said rest and from beneath said alining roll; the rotary motion of said alining roll and the lateral movement of the carrier means acting to effect correct register of the individual blank when transferred to the carrier.

29. In an envelope making machine of the class specified, the combination with means for making tubular envelope blanks having projecting end flaps, means for detaching individual blanks from the end of a continuous envelope tube and advancing them endwise to a predetermined position at which their direct advancement is arrested, a rotary carrier having a series of devices for taking and carrying the blanks laterally from said position and means for applying adhesive gum to the flaps of the carried blanks; of a gummer-retracting means comprising an electromagnet, its armature attached to mechanism for retracting the gum-applying means, a series of conducting surfaces arranged upon and moving with the carrier and in circuit with the magnet, a movable circuit closing member between which and the conducting surfaces the carried blanks pass and act as an insulating shield; whereby the action of the gum-applying means is controlled in accordance with the presence or absence of a blank in position upon the carrier.

30. In an envelope making machine, in combination with means for producing tubular envelope blanks with projection end flaps, a flap-gumming mechanism including a gum reservoir and gum-applying rolls, movable supports for the axle of said rolls, an electromagnet, its armature operatingly connected for lifting said rolls, a rotary carrier provided with a series of devices for taking blanks individually and presenting them to said gumming mechanism, said carrier being provided with a circular track including a series of conducting surfaces in circuit with said magnet and adapted to be covered by passing blanks, a movable contact-member adapted to drag over said blanks and fall upon the conducting surfaces where a blank is absent, thus closing the magnet circuit and energizing the magnet for effecting retraction of the gum applying rolls from the face of the carrier, means for supplying current to the circuit, and means for rotating the carrier.

31. In an envelope making machine comprising means for making and severing tubular envelope blanks from a continuous formed tube, the combination, of a stationary rest-plate having an end barrier for arresting and gaging the longitudinal position of a blank thereon, means for projecting the detached blanks individually upon said rest-plate, a transversely moving carrier provided with pairs of grippers for taking the blanks laterally from said rest-plate, said grippers having offset guards thereon, a centrally alined narrow-faced disk roll supported above the rest-plate, its periphery bearing lightly upon the blank and operating to impel the blank longitudinally towards the end barrier while resisting lateral movement, thereby effecting uniform contact of the edge of the blank with both gripper guards as the grippers close upon the blank, for the purpose set forth.

FREDERICK E. ARROUQUIER.